United States Patent
Le Bideau et al.

(10) Patent No.: US 8,915,975 B2
(45) Date of Patent: Dec. 23, 2014

(54) HIGH-ENERGY NON-AQUEOUS BATTERIES CONTAINING ION-CONDUCTING GELS, AND METHOD FOR PREPARING AND USING SAME

(75) Inventors: Jean Le Bideau, Nantes (FR); Jean-Baptiste Ducros, Viry Chatillon (FR); Dominique Guyomard, Sautron (FR); Patrick Soudan, Mouzeil (FR)

(73) Assignees: Centre National de la Recherche Scientifique, Paris (FR); Universite Montpellier 2—Sciences et Techniques, Montpellier (FR); Universite de Nantes, Nantes (FR)

( * ) Notice: Subject to any disclaimer, the term of this patent is extended or adjusted under 35 U.S.C. 154(b) by 554 days.

(21) Appl. No.: 13/148,401

(22) PCT Filed: Feb. 12, 2010

(86) PCT No.: PCT/FR2010/000115
§ 371 (c)(1),
(2), (4) Date: Oct. 13, 2011

(87) PCT Pub. No.: WO2010/092258
PCT Pub. Date: Aug. 19, 2010

(65) Prior Publication Data
US 2012/0021279 A1    Jan. 26, 2012

(30) Foreign Application Priority Data
Feb. 13, 2009   (FR) .................................... 09 50936

(51) Int. Cl.
| | |
|---|---|
| *H01M 6/00* | (2006.01) |
| *H01M 10/056* | (2010.01) |
| *H01M 10/054* | (2010.01) |
| *H01M 2/16* | (2006.01) |
| *H01M 10/052* | (2010.01) |
| *C08G 77/04* | (2006.01) |

(52) U.S. Cl.
CPC .......... *H01M 2/1646* (2013.01); *H01M 10/056* (2013.01); *H01M 10/054* (2013.01); *H01M 2300/0085* (2013.01); *H01M 2300/0091* (2013.01); *H01M 2300/0068* (2013.01); *Y02E 60/122* (2013.01); *C08G 77/04* (2013.01); *H01M 2300/0045* (2013.01); *H01M 10/052* (2013.01); *H01M 2/1673* (2013.01)
USPC ....................................... 29/623.1

(58) Field of Classification Search
CPC ............ H01M 10/056; H01M 10/054; H01M 10/052; H01M 2300/0085; H01M 2300/0091; H01M 2300/0068; H01M 2300/0043; Y02E 60/122
USPC ........... 29/623.1, 623.5, 623.4; 429/189, 209, 429/231.9, 231.6
See application file for complete search history.

(56) References Cited

U.S. PATENT DOCUMENTS

2003/0194612 A1 *  10/2003   Shembel et al. .............. 429/324

FOREIGN PATENT DOCUMENTS

| | | |
|---|---|---|
| WO | 2005007746 A1 | 1/2005 |
| WO | 2008120162 A2 | 10/2008 |

OTHER PUBLICATIONS

Ahmad et al: "Ionogels encompassing ionic liquid with liquid like performance preferable for fast solid state electrochromic devices" Electrochemistry Communication, Elsevier, vol. 9, No. 7, Jun. 15, 2007, pp. 1635-1638, XP022118S99.
D. Aurbach et al: "On the role of water contamination in rechargeable Li batteries" Electrochimica ACTA, vol. 45, Nov. 22, 1999, pp. 1135-1140, XP002536711.
Sirisopanaporn C et al: "New, ionic liquid-based membranes for lithium battery application" Journal of Power Sources, Elsevier, vol. 186, No. 2, Jan. 15, 2009, pp. 490-495, XP025839956.
Kim et al: "Solvent-free, PYR1ATFI ionic liquid-based ternary polymer electrolyte systems", Journal of Power Sources, vol. 171, No. 2, Sep. 8, 2007, pp. 861-869, XP022238097.
Salminen et al: "Physicochemical properties and toxicities of hydrophobic piperidinium and pyrrolidinium ionic liquids" Fluid Phase Equilibria, vol. 261, No. 1-2, Oct. 19, 2007, pp. 421-426, XP022306846.
Karout A et al: "Silica gelation catalysis by ionic liquids" Catalysis Communications, vol. 10, No. 4, Jan. 10, 2009, pp. 359-361, XP025691781.
International Search Report, dated May 19, 2010, in PCT/FR2010/000115.

* cited by examiner

*Primary Examiner* — Raymond Alejandro
(74) *Attorney, Agent, or Firm* — Young & Thompson

(57) ABSTRACT

Method for the preparation of a composite electrode and accumulator or battery including at least one composite electrode, the method includes a step of pouring a medium including at least one ionic liquid, a lithium, sodium or magnesium salt with at least one inorganic molecular precursor or a polymerizable monomer, the medium being in excess, and an in situ polycondensation or polymerization step.

8 Claims, 5 Drawing Sheets

HIGH-ENERGY NON-AQUEOUS BATTERIES CONTAINING ION-CONDUCTING GELS, AND METHOD FOR PREPARING AND USING SAME

FIELD OF THE INVENTION

A subject of the present invention is high-energy non-aqueous batteries using ion-conducting gels or ionogels, method for their preparation and use thereof.

BACKGROUND

The sol-gel method is well known from the prior art, simple to implement, takes place under mild conditions and facilitates the shaping of materials (Brinker and Scherer, 1990). In standard fashion the sol-gel method consists of a hydrolysis and condensation method which, starting from a molecular precursor (true solution) leads to the formation of a colloidal solution (or sol) then, by connection of the colloidal particles, to the formation of a continuous solid skeleton named a gel. The non-hydrolytic sol-gel method is a particular case of the sol-gel method, taking place in the absence of water (Vioux, 1997). Another notable particular case consists of a sol-gel method for obtaining silica gels by using formic acid (formation of water in situ) (Sharp, 1994; Dai, 2000).

Ionic liquids are formed by the combination of cations and anions and are in the liquid state at temperatures close to ambient temperature. They have remarkable properties such as zero volatility, a high ionic conductivity as well as catalytic properties. They are currently used in numerous fields, in particular as electrolytes (Bonhôte et al., 1996; Olivier-Bourbigou et al., 2000; Branco et al., 2002; Doyle et al., 2000; Noda et al., 2000; Sun et al., 2001; Aurbach et al., 2008 Journal of Power Sources, DOI:10.1016/j.jpowsour.2008.09.099).

International patent application WO 2005/007746 describes ionogels which are ionic conductors presented in the form of a monolithic solid in which an ionic liquid is confined in order to combine the physico-chemical properties of a mineral or organomineral solid with those of an ionic liquid. These ionogels are produced in a single step which consists of mixing in homogeneous phase a solution, in ionic liquid medium, of one or more sol-gel precursors (alkoxysilane, alkylalkoxysilane, arylalkoxysilane, halogenosilane, halogenoalkoxysilane, metal alkoxide, metal alkylalkoxide or metal arylalkoxide, metal halide, etc.), alone, or in the presence of an aqueous solution (acid, basic, saline, etc.), of a carboxylic acid, or another oxygen donor (alcohol, ether, etc.).

Although these ionogels have many useful properties, their use as electrolytes also has drawbacks due to their high propensity to shrink during preparation, a low solidity leading to an electronic short circuit between the two electrodes that the ionogel must separate, and to a water content that is too high for use with lithium.

Solid batteries are batteries where the electrodes and the electrolyte are solids; the electrolyte being an insulating compound which electronically separates the positive electrode from the negative electrode while allowing the passage of ionic species (Li+, Na+ or Mg 2+ ions) between the two. Such batteries make it possible to reduce the risks of leakage of liquids, calcination, emission of gasses etc. that are observed with batteries using conventional liquid electrolytic solutions and as a result the safety of use is improved. However, due to the relatively low conductivity of the solid electrodes and electrolytes, the batteries obtained are produced in thin layers, and as a result deliver a low energy density per unit of surface area.

SUMMARY OF THE INVENTION

Moreover there is a need to make available high-energy all-solid-state batteries.

Consequently the inventors have developed a high-energy all-solid-state Li, (Li-ion or Li-metal), Na and Mg battery technology based on ionogels.

A further subject of the invention is a method for the preparation of a composite electrode comprising:

a. a step of the pouring onto a composite electrode of a medium comprising:
   at least one ionic liquid and optionally
   at least one solvent, or
   at least one polymer or
   a mixture of at least one solvent and one polymer
   said medium also comprising at least one lithium, sodium or magnesium salt, with
   i. either at least one inorganic molecular precursor containing at least one hydrolyzable group, in the absence of an acid, and optionally in the presence of a catalyst and optionally in the presence of a catalyst capable of reducing the polycondensation time,
   ii. or at least one polymerizable monomer,
   iii. or a mixture of the two,
   there being an excess of said medium in order to impregnate the porosity of the electrode and form a film on the surface of said electrode, b. a step of in situ polycondensation of the at least one inorganic molecular precursor or a step of polymerization of the at least one polymerizable monomer or of their mixture by being left to stand for a period that can extend to several days until a gel is obtained, containing within it the ionic liquid and the aforementioned lithium, sodium or magnesium salt and optionally the solvent or the polymer or the mixture of the two, said gel being situated both within the porosity of said composite electrode and in the form of a layer in contact with said composite electrode in order to obtain a continuous matrix between the electrolyte contained within the electrode and the ionogel electrolyte situated in contact with the electrode, and optionally c. a step of elimination of water until the water content of the ion-conducting gel is less than 50 ppm.

The water elimination step is carried out at this stage if it is desired to use an electrode impregnated with ionogel for electrochemical sensors, or lithium air batteries with a composite negative electrode, such as $Li_4Ti_5O_{12}$ or other.

The starting composite electrode used in the method according to the invention can be any positive electrode or any negative electrode that is commercially available or prepared by the techniques known to a person skilled in the art. By way of example of a positive electrode, there can be mentioned in particular $LiFePO_4$ or $LiNi_{1/3}Mn_{1/3}Co_{1/3}O_2$ and by way of negative electrode negative there can be mentioned in particular graphite carbon or lithium-metal electrodes.

Thus according to the invention the method is carried out in a single step ("one pot").

The expression "ionogel" denotes a continuous solid skeleton confining an ionic liquid with optionally a solvent or a polymer or a mixture of the two.

The expression "ionic liquid" denotes the combination of cations and anions in the liquid state at temperatures close to ambient temperature, for example liquid at a temperature comprised between −20 and +100° C.

According to the invention, the salts of lithium, sodium or magnesium which are used are chosen from the salts commonly used in the field. By way of example, the lithium salt can be chosen from $LiPF_6$, $LiAsF_6$, $LiClO_4$, $LiBF_4$, $LiC_4BO_8$, $Li(C_2F_5SO_2)_2N$, $Li[(C_2F_5)_3PF_3]$, $LiCF_3SO_3$, $LiCH_3SO_3$, $LiN(SO_2CF_3)_2$, and $LiN(SO_2F)_2$.

According to the invention, the solvent can be a liquid solvent comprising one or more compounds chosen from the linear carbonates such as for example ethylene carbonate, dimethyl carbonate or diethyl carbonate, or the cyclic carbonates, linear or cyclic ethers, linear esters such as ethyl acetate or the cyclic esters, linear or cyclic sulphones, sulphamides and nitriles or a mixture thereof. Advantageously, the solvent is constituted by at least two carbonates chosen from ethylene carbonate, propylene carbonate, dimethyl carbonate, diethyl carbonate and methyl and ethyl carbonate.

The polymers are those conventionally used in the field and known to a person skilled in the art, namely solid or semi-solid materials (gels) which can support and maintain a porous structure, the pores of which are compressible. Polysaccharides can also be used.

The polymerizable monomers are also those conventionally used in the field and known to a person skilled in the art.

The proportions in the ionic liquid/solvent, ionic liquid polymer, or ionic liquid/solvent/polymer mixtures are established by a person skilled in the art according to the type of compounds used and form part of this general knowledge.

The expression "inorganic molecular precursor" denotes the reagent containing the base element or one of the base elements of which the gel will be formed; the precursor has the preceding element or elements surrounded by ligands (appendages not containing the base element or elements). It is also called a "sol-gel precursor".

The expression "hydrolyzable group" denotes a chemical group bound to a molecular entity and capable of being separated from the latter by hydrolysis. The molecular precursors used within the framework of the invention either comprise at least 3 hydrolysable groups or already have a dimensionality (more or less branched polymer chains) for which 1 or 2 hydrolysable groups are sufficient for the formation of the gel.

Within the meaning of the present invention the catalyst capable of reducing the polycondensation time can be chosen from any compound having this property, in particular metals, metal complexes, in particular metal salts, and the metal oxides. Advantageously the catalyst is tin laurate.

According to the invention, the concentration of lithium, sodium or magnesium salt is advantageously comprised between 0.1 mol/L and 2 mol/L of ionic liquid or of the ionic liquid/solvent or of the ionic liquid/polymer or ionic liquid/solvent/polymer mixture.

According to the present invention, the ionic liquid, the solvent or the polymer can be used dry (less than 50 ppm water) or already hydrated (containing generally less than 10% water by weight). When they are very dry, they become progressively hydrated during the polycondensation or polymerization reaction.

In an advantageous embodiment of the method according to the invention, an ionic liquid only is used.

In another advantageous embodiment of the method according to the invention, the salt contained in the medium is a lithium salt.

According to an advantageous method of the present invention the ionic liquid is chosen from those comprising as cation an imidazolium or pyridinium, pyrrolidinium or piperidinium ring, said ring is capable of being substituted on the nitrogen atom, in particular by one or more alkyl groups with 1 to 8 carbon atoms and on the carbons in particular by one or more alkyl groups with 1 to 30 carbon atoms.

Within the meaning of the present invention, by alkyl group with 1 to 30 carbon atoms is meant saturated hydrocarbon chains or those carrying one or more double bonds and containing 1 to 30 carbon atoms, advantageously 1 to 18 carbon atoms and even more advantageously 1 to 8 carbon atoms; there can be mentioned by way of example the methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups, In an advantageous embodiment of the invention, the cation is a pyrrolidinium ring of formula (I) below:

in which
$R_1$ and $R_2$ each represent independently an alkyl group with 1 to 8 carbon atoms,
$R_3$ to $R_6$, each represent independently a hydrogen atom or an alkyl group with 1 to 30 carbon atoms, advantageously 1 to 18 carbon atoms, also more advantageously 1 to 8 carbon atoms, or a piperidinium ring of formula (II) below:

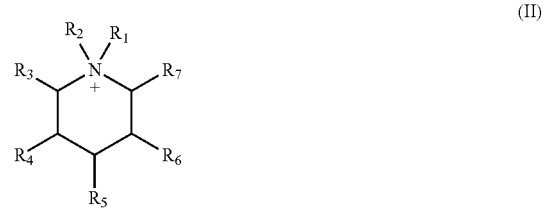

in which $R_1$ and $R_2$ each represent independently of each other an alkyl group with 1 to 8 carbon atoms and
$R_3$ to $R_7$, each represent independently of each other a hydrogen atom or an alkyl group with 1 to 30 carbon atoms, advantageously 1 to 18 carbon atoms, even more advantageously 1 to 8 carbon atoms, In a particularly advantageous embodiment, the cation is chosen from

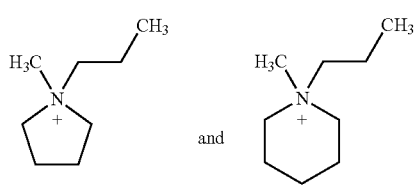

According to an advantageous method of the present invention the ionic liquid is chosen from those comprising as anion those chosen from the halides, the perfluorated anions and the borates.

The halide anions are in particular chosen from the following anions: chloride, bromide, fluoride or iodide.

In a particularly advantageous embodiment of the invention, the anion is chosen from:

bis(trifluoromethylsulphonyl)imide of formula:

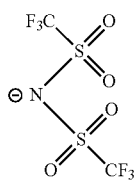

hexafluorophosphate of formula $PF_6^-$.
tetrafluoroborate, of formula $BF_4^-$ and
oxaloborate of formula

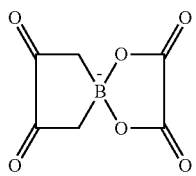

According to the invention, the inorganic molecular precursor is advantageously chosen from elements of periods 3, 4 and 5 of the periodic table.

By derivatives of the elements of periods 3, 4 and 5 of the periodic table is meant in particular silicon and other organometallic compounds, in particular those based on titanium, zinc, zirconium, silver, tin or aluminium, such as for example $TiCl_4$, $Ti(OCH(CH_3)_2)_4$, $Al(OCH(CH_3)_2)_3$ $Si(OCH_3)_4$, $SnCl_4$.

In a particularly advantageous embodiment of the invention, the inorganic molecular precursor is a compound of general formula:

in which:
x is an integer varying from 0 to 4,
R represents an alkyl group with 1 to 4 carbon atoms, and
R' represents:
an alkyl group comprising 1 to 4 carbon atoms, or
an aryl group comprising 6 to 30 carbon atoms, advantageously 6 to 10 carbon atoms or
a halogen atom,
said compound being in particular tetramethoxysilane or methyltrimethoxysilane or a mixture of these compounds.

Within the meaning of the present invention, by aryl comprising 6 to 30 carbon atoms is meant a single- or multi-ring aromatic compound comprising 6 to 30 carbon atoms, in particular the phenyl, tolyl, xylyl, naphthyl, anthryl, and phenantryl groups.

In a particularly advantageous embodiment of the invention, the molar ratio of ionic liquid/inorganic molecular precursor or solvent/inorganic molecular precursor or polymer/inorganic molecular precursor or mixture of solvent/ionic liquid)/inorganic molecular precursor or mixture of polymer solvent/inorganic molecular precursor or mixture of ionic liquid polymer/inorganic molecular precursor or mixture of ionic liquid solvent polymer/inorganic molecular precursor in the medium is comprised between 0.25 and 1. The choice of this molar ratio makes it possible to obtain a compound having good mechanical characteristics (non-friable, capable of being handled).

In an advantageous embodiment of the invention, the mixture is left to stand for 2 to 9 days under ambient atmosphere and temperature.

According to the invention, step c) of elimination of water can be carried out by any technique known to a person skilled in the art, in particular by placing in an oven under vacuum at a temperature comprised between 50 and 100° C. for a duration comprised between 1 h and 5 days.

The method comprising the following steps:
a. a step of pouring a medium comprising:
at least one ionic liquid and optionally,
at least one solvent, or
at least one polymer or
a mixture of the two
said medium also comprising at least one lithium, sodium or magnesium salt, with
i. either at least one inorganic molecular precursor containing at least one hydrolyzable group, in the absence of an acid and optionally in the presence of a catalyst capable of reducing the polycondensation time,
ii. or at least one polymerizable monomer,
iii. or a mixture of the two,
b. leaving the mixture obtained in step a) to stand of for a duration of up to several days until a gel is obtained containing within it the ionic liquid and the aforementioned lithium, sodium or magnesium salt and optionally the solvent or the polymer or the mixture of the two and capable of being shaped, particularly in the form of a transparent monolithic solid,
c. a step of eliminating the water until the water content of the ion-conducting gel is less than 50 ppm.

allows the preparation of an ion-conducting gel in solid form, also called "ionogel".

The ionogels thus obtained have the following characteristics:
they are continuous films,
they are stable up to temperatures of approximately 250° C., in particular up to approximately 100° C.,
they are transparent,
they are ionic conductors, their ionic conductivity being in particular comprised between approximately $10^{-4}$ and $10^{-3}$ S·cm$^{-1}$ at ambient temperature and between $10^{-2}$ and $10^{-1}$ at 230° C.
they are electronic insulators and
they exhibit shrinkage of less than 20% by volume after elimination of water.

They are also characterized by the presence of a continuous iono-covalent matrix.

The ionogels such those obtained by implementing the method described previously, comprise an ionic liquid and optionally a solvent or a polymer or a mixture of solvent and polymer and a lithium or sodium or magnesium salt as defined previously confined within a solid continuous matrix formed from at least one inorganic molecular precursor such as defined previously.

The expression "continuous film" denotes a solid skeleton extending throughout the material without interruption, at least one of the dimensions of which is from 1 to 100 μm.

By the expression "confined" is meant that the ionic liquid or the solvent or the polymer remains contained in the material, that it does not flow out of it and does not evaporate out of it.

Due to their transparency, their ionic conductivity and their insulating ability, the ionogels according to the invention can have numerous applications. As an application based on the transparency there can be mentioned for example the incorporation of coloured indicators, or their use in electrochrome systems, for example for display. As applications based on the ionic conductivity there can be mentioned by way of example use in the context of the preparation of electrochemical accumulators and photovoltaic cells which need conductive ionic membranes that perform well at temperatures of the order of 100° C.

One of the advantages of the invention resides in the fact that the latter makes it possible to have solid ionic conductors that can be shaped as thin films and are stable and perform well up to temperatures at least of the order of 100° C.

They are particularly useful for the construction of high-energy all-solid-state batteries.

A further purpose of the present invention is a composite electrode capable of being obtained by the method according to the invention.

All-solid-state lithium, sodium or magnesium accumulator or battery having a continuous electrode-electrolyte interface comprising either a negative electrode or a positive electrode, or both electrodes prepared according to the invention.

The accumulator or battery according to the invention can be prepared by any technique known to a person skilled in the art by assembling two electrodes according to the invention or by that of a positive electrode according to the invention with a conventional negative electrode or by that of a negative electrode according to the invention with a conventional positive electrode. In all cases an all-solid-state accumulator or battery is obtained in which the ionogel acts as a separator between the two electrodes and electrolyte.

The accumulators or batteries according to the invention can be used in all the conventional applications for batteries, in particular that of lithium batteries, in particular in portable electronic devices such as for example cell phones, laptops, computers and camcorders.

BRIEF DESCRIPTION OF THE DRAWINGS

The following

FIG. 1 shows an electrode according to the invention capable of being obtained by the method according to the invention from an ionic liquid and a lithium salt. Area A corresponds to the electrode, the pores of which are filled with ionogel (appearing in the form of grains that are lighter in colour). Area B corresponds to the ionogel deposited at the surface of the electrode, which will act as a separator and electrolyte when assembled with another electrode in order to form an accumulator and C shows the structure of the ionogel comprising the ionic liquid/lithium salt medium confined in a stiff structure.

FIG. 2 represents the state of the prior art and shows the specific capacity obtained when the positive electrode $(Li_1Ni_{1/3}Mn_{1/3}Co_{1/3}O_2)$/solid electrolyte (ionogel) interface is not continuous.

FIG. 3 shows the capacity obtained when the positive electrode $(Li_{1/3}Mn_{1/3}Co_{1/3}O_2)$/solid electrolyte (ionogel) interface is optimized according to the invention (Example 2) in the presence of a variable molar ratio of ionic liquid to silicon (- - -): molar ratio=0.25, (------): molar ratio=0.5 and (-): molar ratio=1.

FIG. 4 shows the reversibility of the charge/discharge reaction (extraction/insertion of Li⁻ ions) of The positive electrode. ● discharge; ▲ charge.

FIG. 5 shows the absence of an undesirable effect of the base weight on the electrochemical performance of an electrode prepared according to Example 2 (------) base weight=2 mg·cm⁻², (-): base weight=4 2 mg·cm⁻².

DETAILED DESCRIPTION OF THE INVENTION

Example 1

Composite Electrode on which a Separately-Synthesized Ionogel is to be Deposited 1.1. Operating Method 1.1.1. General Synthesis of Ionogels a) An electrolyte is synthesized using a mixture of the ionic liquid 1-methyl-1-propylpyrrolidinium bis(trifluoromethylsulphonyl)imide (Py13-TFSI) or the ionic liquid 1-methyl-1-propylpiperidinium bis(trifluoromethylsulphonyl)imide (PP13-TF SI) and a lithium salt (LiTFSI). The concentration of LiTFSI is set between 0.1 and 2 mol·L⁻¹. This mixture is called solution 1.

b) A mixture of a volume of tetramethoxysilane (TMOS) with a volume of methyltrimethoxysilane (MTMS) is produced. This mixture is called solution 2.

c) Synthesis of the sol: the electrolyte (solution 1) is mixed with the silica precursor (solution 2) according to the proportions by weight given in Table 1 and Table 2 below.

TABLE 1

Proportions by weight used for the synthesis of ionogels Py13-TFSI-LiTFSI (Py13-TFSI + 0.5 mol/L LiTFSI):

| Molar ratio | Electrolyte mass (g) | TMOS-MTMS mass (g) |
|---|---|---|
| 0.25 | 1.000 | 1.286 |
| 0.5 | 1.000 | 0.643 |
| 1 | 1.000 | 0.322 |

TABLE 2

Proportions by weight used for the synthesis of ionogels PP13-TFSI-LiTFSI (PP13-TFSI + 0.5 mol/L LiTFSI)

| Molar ratio | Electrolyte mass (g) | TMOS-MTMS mass (g) |
|---|---|---|
| 0.25 | 1.000 | 1.243 |
| 0.5 | 1.000 | 0.622 |
| 1 | 1.000 | 0.311 |

1.1.2. Preparation of the Electrode

It is prepared according to the techniques known from the prior art, by simple deposition of the ionogel onto an electrode.

1.2. Results

Figure 1:
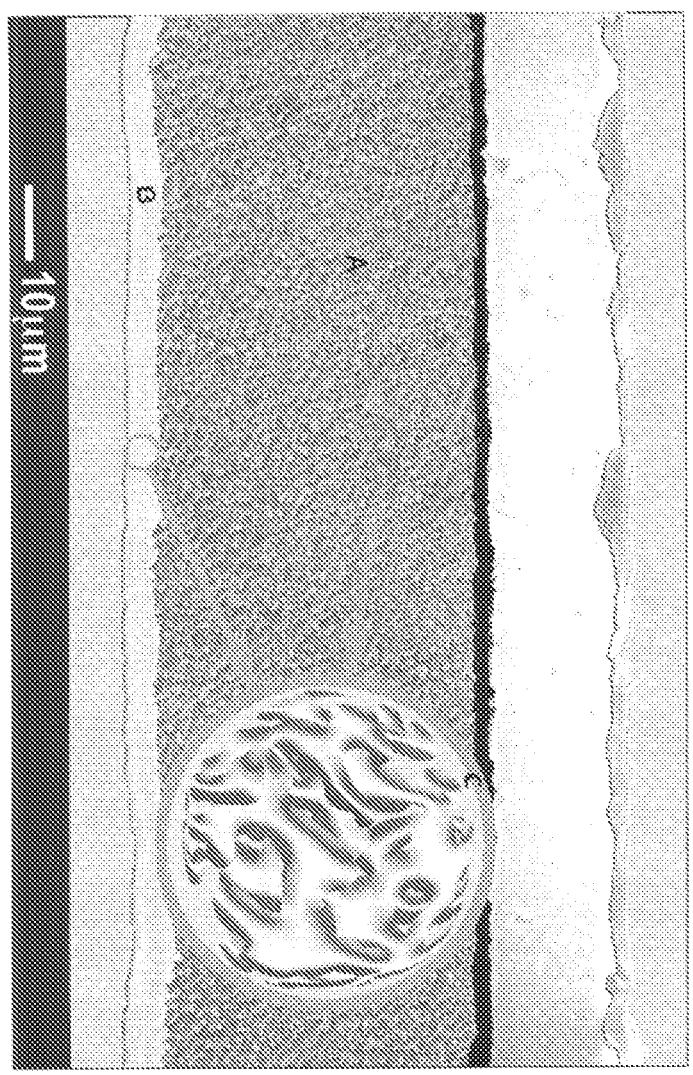
FIGS. 1 to 5 illustrate the invention.
Figure 2:
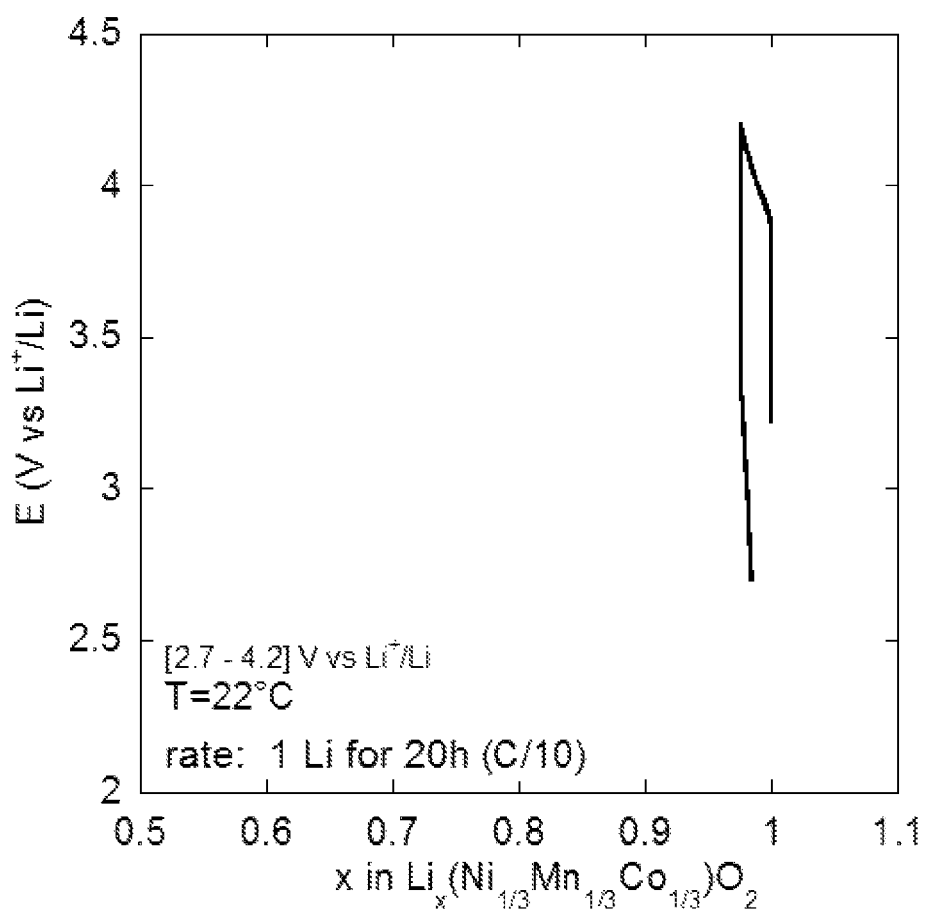

These are given in FIG. 2.

In this case, the positive electrode $(Li_1Ni_{1/3}Mn_{1/3}Co_{1/3}O_2)$/solid electrolyte (ionogel) interface is not continuous. As a result, the specific capacity obtained is extremely low (a few mAh·g⁻¹) and means the device is of no use.

The low specific capacity obtained (approximately 1% of the specific capacity obtained with an electrolyte of the ionic liquid Py13-TFSI+0.35 mol/kg LiTFSI) type is probably due to the surface grains of the composite electrode, which are the only ones in direct contact with the solid electrolyte.

Example 2

Electrode Prepared According to the Invention

1.1. Operating Method

An electrolyte is used that was previously synthesized from a mixture of 8.0709 g of Py13-TFSI and 0.8119 g of LiTFSI, i.e. an electrolyte of type Py13-TFSI+0.35 mol/kg LiTFSI (i.e. approximately 0.5 mol/L).

0.4645 g of this electrolyte is used, mixed with 0.2948 g of the TMOS-MTMS mixture in a glass tablet bottle. A sol is thus obtained having a molar ration of ionic liquid to silicon of 0.5. It is mixed for 1 hour using a magnetic stirring bar.

200 μL of this mixture is then removed and poured onto the (porous) composite electrode of $Li_1Ni_{1/3}Mn_{1/3}Co_{1/3}O_2$ type. The ionogel remaining is left in the glass tablet bottle, in order to ascertain the gelation time. In this case, the gelation time is 30 hours.

After 30 hours, the gelled composite electrode is placed in an oven at T=100° C. under vacuum for 24 hours.

The composite electrode that has been "ionogelized" in this way, having a continuous positive electrode ($Li_1Ni_{1/3}Mn_{1/3}Co_{1/3}O_2$)/solid electrolyte (ionogel) interface (or junction) can then be used in a lithium accumulator. A lithium metal auxiliary electrode is thus added via downward pressure (of the order of 1 kg/cm$^2$), on the solid electrolyte (ionogel).

1.2. Results

Figure 3:
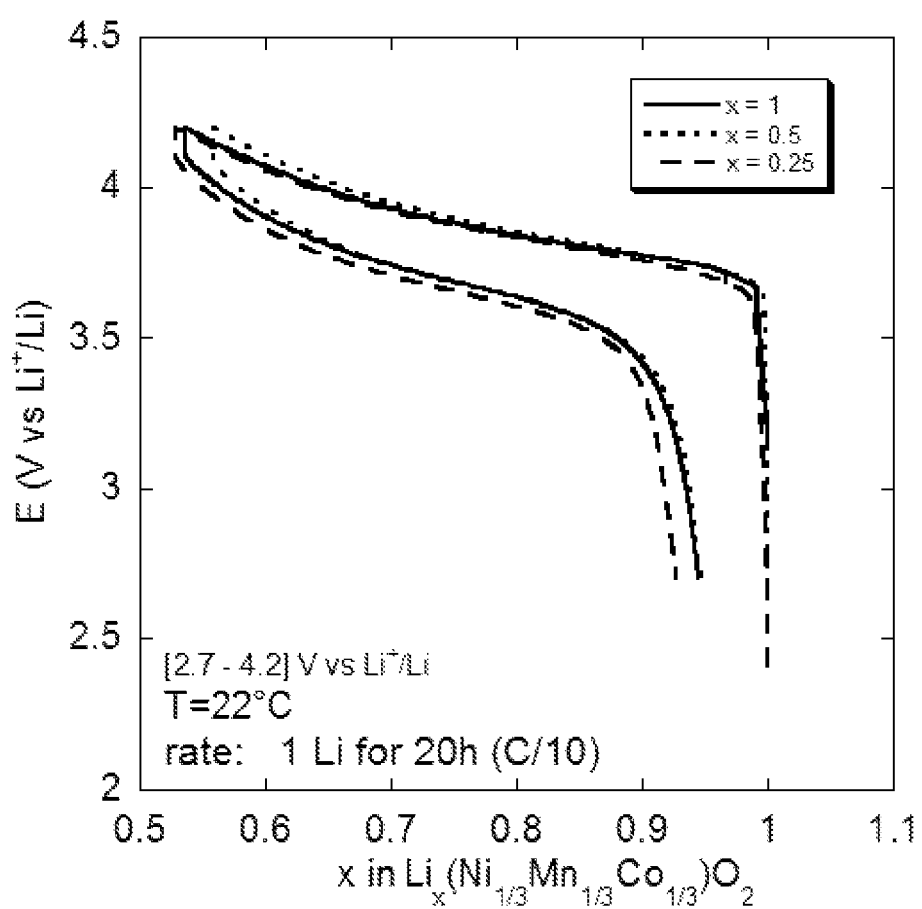
Figure 4:
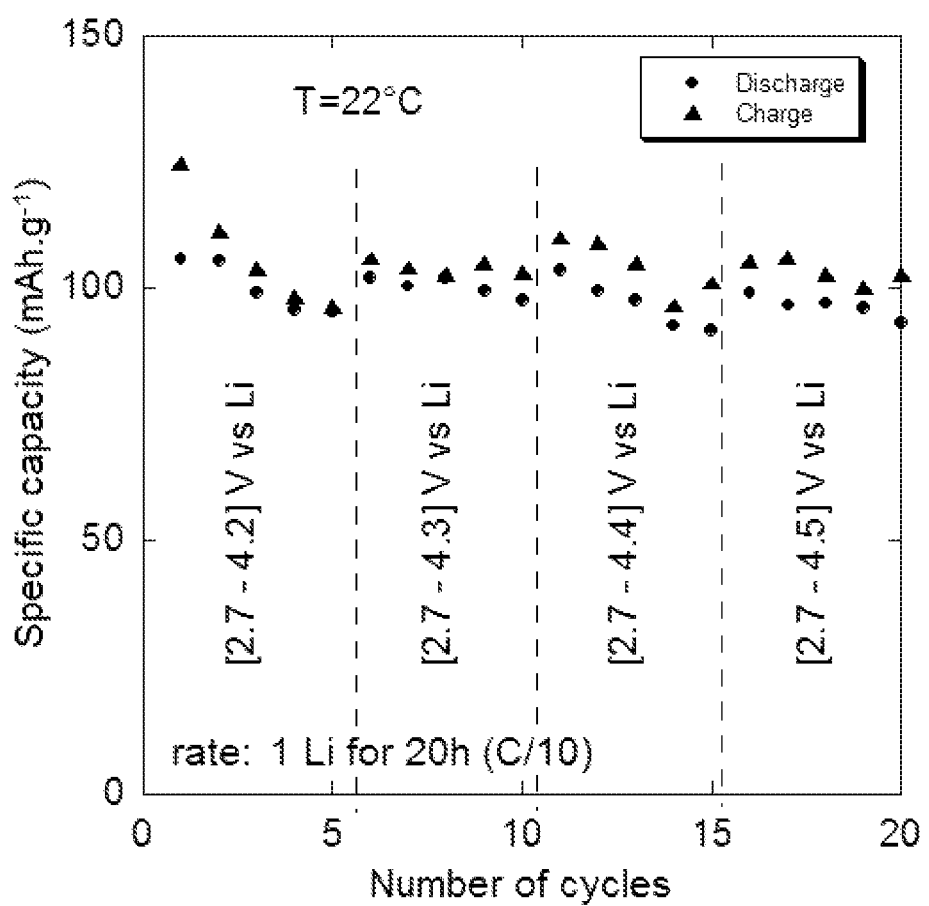

These are given in FIGS. 3 and 4.

When the positive electrode (Li1Ni1/3Mn1/3Co1/3O2)/solid electrolyte (ionogel) interface is optimized, the electrochemical performances obtained are identical to the capacities obtained for a $Li_1Ni_{1/3}Mn_{1/3}Co_{1/3}O_2$/ionic liquid (Py13-TFSI+0.35 mol/kg LiTFSI)/Li half cell. That is to say, a specific capacity of 110 mAh·g−1 at a charge/discharge rate of one Li+ ion extracted/inserted in 20 hours. The polarization is identical as an all-solid-state electrolyte and as an ionic liquid electrolyte. Moreover, the molar ratio of ionic liquid to silicon has no effect on the electrochemical performances (see FIG. 3). In this example, the auxiliary electrode is a lithium metal electrode. The Li metal/electrolyte interface is provided by a pressure (of the order of 1 kg/cm$^2$) between the Li metal electrode and the solid electrolyte.

The charge/discharge reaction (extraction/insertion of Li+ ions) of the positive electrode is reversible, as shown in FIG. 4. It is apparent that cycling is still possible up to a potential reaching 4.5 V vs Li+/Li.

No new electrochemical reduction or oxidation step is initiated in the galvanostatic curves (not shown here), which shows that the electrolyte is electrochemically stable up to 4.5 V vs Li$^+$/Li.

Example 3

Measurement of the Effect of the Base Weight on Electrochemical Performance

3.1. Operating Method

The $Li_1Ni_{1/3}Mn_{1/3}Co_{1/3}O_2$/solid electrolyte (ionogel)/Li accumulator prepared in Example 2 is placed in a sealed Swagelok® type electrochemical cell. This step is carried out in a glove box, in which the moisture and oxygen levels are less than 5 ppm. The charge-discharge experiments are carried out using a VMP (Bio-Logic) multi-way potentiostat/galvanostat linked to a computer and controlled by the EC-Lab (Bio-Logic) software.

Charge-discharge experiments with accumulators are carried out at constant current. The current is calculated and set by the user so that one mole of lithium ions is inserted (or extracted) in a time period set by the user (generally 20 hours). This time defines the charge-discharge rate of the accumulator. Cycling is carried out within a window of potential comprised between 2.7 V and 4.5 V vs Li$^+$/Li. The cycling temperature is set by the user, by placing the Swagelok® cell in an oven that can be regulated.

3.2 Results

Figure 5:
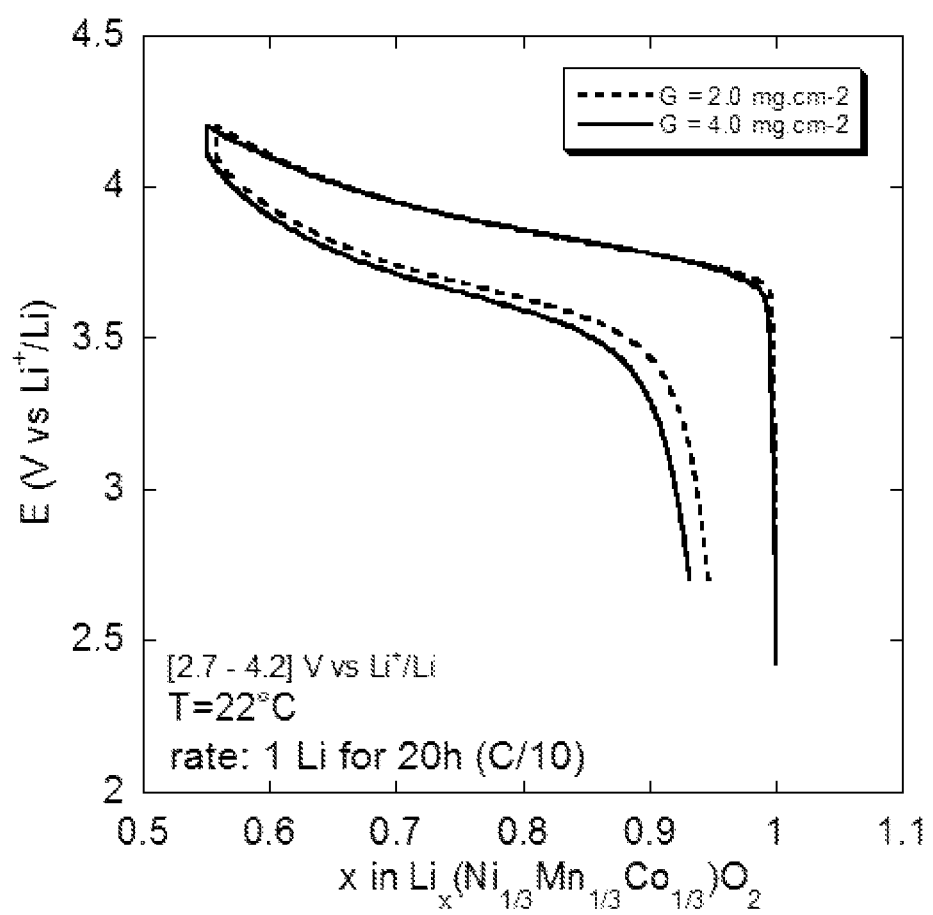

These are illustrated in FIG. 5.

The base weight of the composite electrode (which corresponds to the quantity by mass of active material per unit of surface area) has no effect on the electrochemical performance obtained with a solid ionogel electrolyte.

Thus with ionogel technology, it is possible to use composite electrodes that are already commercially developed, without changing their composition. Similarly, a major drawback of the all-solid-state batteries currently developed is their low base weight: the composite electrode containing only (a maximum of) 40% by mass of active material. Now, in the case of ionogel electrolytes, the porosity of the commercial composite electrode is completely soaked by the ionogel: thus, 90% of active material by mass is retained in the composite electrode, and the electrochemical performances obtained are identical to those obtained with an electrolyte of the ionic liquid type.

The invention claimed is:

1. A method for the preparation of a composite electrode comprising:
    a. a step of pouring onto a composite electrode containing an electrolyte a medium comprising:
       at least one ionic liquid and optionally,
       at least one solvent, or
       at least one polymer or
       a mixture of at least one solvent and one polymer, said medium also comprising at least one salt selected from the group consisting of lithium, sodium and magnesium, with
       i. either at least one inorganic molecular precursor containing at least one hydrolysable group, in the absence of an acid and optionally in the presence of a catalyst for reducing polycondensation time,
       ii. or at least one polymerizable monomer,
       iii. or a mixture of the at least one inorganic molecular precursor and the at least on polymerizable monomer,
       said medium being present in an amount is sufficient to impregnate pores of said composite electrode and to form a film on the surface of said composite electrode,
    b. a step of in situ polycondensation of the at least one inorganic molecular precursor or a step of polymerization of the at least one polymerizable monomer or of the mixture of the at least one inorganic molecular precursor and the at least on polymerizable monomer by standing for a duration of up to nine days until an ion-conducting gel is obtained containing an electrolyte of the ionic liquid and the at least one salt and optionally the at least one solvent or the at least one polymer or the mixture of the at least one solvent or the at least one polymer, said ion-conducting gel being situated both within the pores of said composite electrode and as a layer in contact with said composite electrode in order to obtain a continuous matrix between the electrolyte contained within said composite electrode and the electrolyte of the ion-conducting gel situated in contact with said composite electrode, and optionally c. a step of eliminating water until the ion-conducting gel has a water content of less than 50 ppm.

2. The method according to claim 1, wherein the medium comprises said at least one ionic liquid, without said at least one solvent or said at least one polymer.

3. The method according to claim 1, wherein the at least one salt contained in the medium is a lithium salt.

4. The method according to claim 1, wherein the at least one ionic liquid has a cation selected from the group consisting of an imidazolium ring, a pyridinium ring, a pyrrolidinium ring and a piperidinium ring, said ring being capable of being substituted on the nitrogen atom by one or two alkyl groups with 1 to 8 carbon atoms and on the carbon atoms by one or more alkyl groups with 1 to 30 carbon atoms.

5. The method according to claim 4, wherein the at least one ionic liquid has an anion selected from the group consisting of halides, perfluorated anions and borates.

6. The method according to claim 1, wherein the at least one inorganic molecular precursor is an element of periods selected from the group consisting of 3, 4 and 5 of the periodic table.

7. The method according to claim 6, wherein the at least one inorganic molecular precursor is a compound of general formula:

$$R'_x(RO)_{4-x}Si$$

in which:
x is an integer varying from 0 to 4,
R represents an alkyl group with 1 to 4 carbon atoms, and
R' represents:
an alkyl group comprising 1 to 4 carbon atoms, or
an aryl group comprising 6 to 30 carbon atoms, or
a halogen atom.

8. The method according to claim 2, characterized in that the at least one salt contained in the medium is a lithium salt.

* * * * *